Patented Mar. 21, 1939

2,151,370

UNITED STATES PATENT OFFICE 2,151,370

PROCESS FOR PREPARING A NEW TETRALIN DERIVATIVE

Yasuhiko Asahina, Tokyo, Japan

No Drawing. Application March 12, 1938, Serial No. 195,656. In Japan June 7, 1937

2 Claims. (Cl. 260—396)

This invention relates to a process for preparing a new tetralin derivative and its object is to obtain a new substance which has an anthelmintic effect.

The process of this invention consists of obtaining first 6-hydroxylamino-tetralin by reducing 6-nitroltetralin and of subsequently treating the product with a dilute mineral acid to produce tetralylquinol, a new substance, which has a strong anthelmintic effect.

6-hydroxylamino-tetralin is made from 6-nitrotetralin by an ordinary method of reduction, for instance, reduction of a solution of tetralin in either ethanol or methanol or other alcohols by a mixture of zinc and a chloride of either ammonium or calcium or barium. Reduction by either ammonium amalgam or ammonium sulfide or by electrolytic process is also used for the purpose. (Journal für praktische Chemie, Neue Folge, Bd. 142,167).

The product, 6-hydroxylamino-tetralin, is then subjected to Bamberger's reaction by using a mineral acid so that tetralylquinol is obtained.

This substance has not been reported so far in any literature. It is a prismatic crystal and its melting point is 124° C.–125° C.

It is an effective anthelmintic and acts directly upon ascaris and other nematodes.

The aforementioned chemical reactions may be represented by the following chemical scheme:

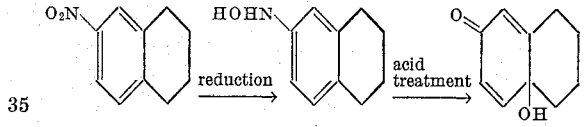

Example 1

5 grams of 6-nitrotetralin is dissolved in 25 cc. of 85% ethanol and 0.5 gram to 1.0 gram of chloride of either ammonium or calcium or barium is added thereto. After the addition of 5 grams to 6 grams of zinc powder, the mixture is boiled so as to secure complete reduction of 6-nitrotetralin. It is then diluted with water and the reduction product, 6-hydroxylamino-tetralin, is extracted with ether. This ether solution is shaken with 100 cc. of 5% sulfuric acid, whereby the substance is now transferred into the acid solution. The acid solution is heated on a water-bath for 5 to 10 minutes and is extracted with ether after cooling.

The heating and extraction with new ether are repeated several times. The ether extracts thus obtained are all united and condensed by evaporation. Upon the addition of petroleum-ether to the condensed ether extract a crystalline precipitate is obtained, which is subjected to re-crystallization using ether. The yield is 0.4 gram.

Example 2

5 grams of 6-nitrotetralin dissolved in 50 cc. ethanol is reduced in the cold with ammonium amalgam which has been obtained by electrolyzing ammonium sulfate with mercury cathode. The reduction product, 6-hydroxylamino-tetralin, is treated in the same manner as described in the example 1, thus tetralylquinol being obtained. The yield is 0.4 gram.

What I claim is:

1. A process of preparing a tetralin derivative possessing anthelmintic effect, which comprises reducing 6-nitrotetralin to 6-hydroxylamino-tetralin and converting the latter to tetralylquinol by treatment with a mineral acid.

2. Tetralylquinol, corresponding to the formula:

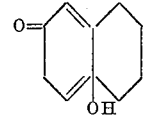

and being a tetralin derivative with anthelmintic effect.

YASUHIKO ASAHINA.